(12) United States Patent
Achhra et al.

(10) Patent No.: US 11,023,915 B2
(45) Date of Patent: Jun. 1, 2021

(54) SYSTEM AND METHOD FOR ACTIVITY BASED INTERACTION

(71) Applicant: VISA INTERNATIONAL SERVICE ASSOCIATION, San Francisco, CA (US)

(72) Inventors: Santosh Lachhman Achhra, Singapore (SG); Stanislav Tsikine, San Jose, CA (US); Tarun Jain, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 901 days.

(21) Appl. No.: 15/400,772

(22) Filed: Jan. 6, 2017

(65) Prior Publication Data

US 2018/0197194 A1 Jul. 12, 2018

(51) Int. Cl.
*G06Q 30/02* (2012.01)
*G06Q 20/32* (2012.01)
*G06Q 20/40* (2012.01)

(52) U.S. Cl.
CPC ....... *G06Q 30/0224* (2013.01); *G06Q 20/327* (2013.01); *G06Q 20/405* (2013.01); *G06Q 30/0207* (2013.01)

(58) Field of Classification Search
CPC ............. G06Q 30/0224; G06Q 20/405; G06Q 20/327; G06Q 30/0207
See application file for complete search history.

(56) References Cited

U.S. PATENT DOCUMENTS

| | | | | |
|---|---|---|---|---|
| 8,589,293 | B2 * | 11/2013 | Singh | G06Q 20/3278 705/39 |
| 2012/0166257 | A1 * | 6/2012 | Shiragami | G06Q 30/0207 705/14.1 |
| 2014/0188586 | A1 * | 7/2014 | Carpenter | G06Q 20/02 705/14.23 |
| 2014/0188710 | A1 * | 7/2014 | Basu | G06Q 20/023 705/39 |
| 2014/0222533 | A1 * | 8/2014 | Ovick | G06Q 30/0283 705/14.23 |
| 2015/0142689 | A1 * | 5/2015 | Squires | G01C 22/00 705/329 |
| 2016/0098714 | A1 * | 4/2016 | Jinks | G06Q 20/405 705/26.35 |
| 2017/0337554 | A1 * | 11/2017 | Mokhasi | G06F 3/0362 |
| 2018/0075420 | A1 * | 3/2018 | Barnett | G06Q 20/3224 |

* cited by examiner

*Primary Examiner* — Sam Refai
*Assistant Examiner* — Kyle G Robinson
(74) *Attorney, Agent, or Firm* — Kilpatrick Townsend & Stockton LLP

(57) ABSTRACT

A method is disclosed. The method includes receiving an authorization request message for a transaction from an access device. The authorization request message includes a value and an account identifier. The user device is used by a user to conduct a transaction with the resource provider. The method also includes determining an activity metric associated with the user of the user device, determining a value alteration based at least in part on the activity metric, and applying the value alteration to the value for the transaction.

13 Claims, 5 Drawing Sheets

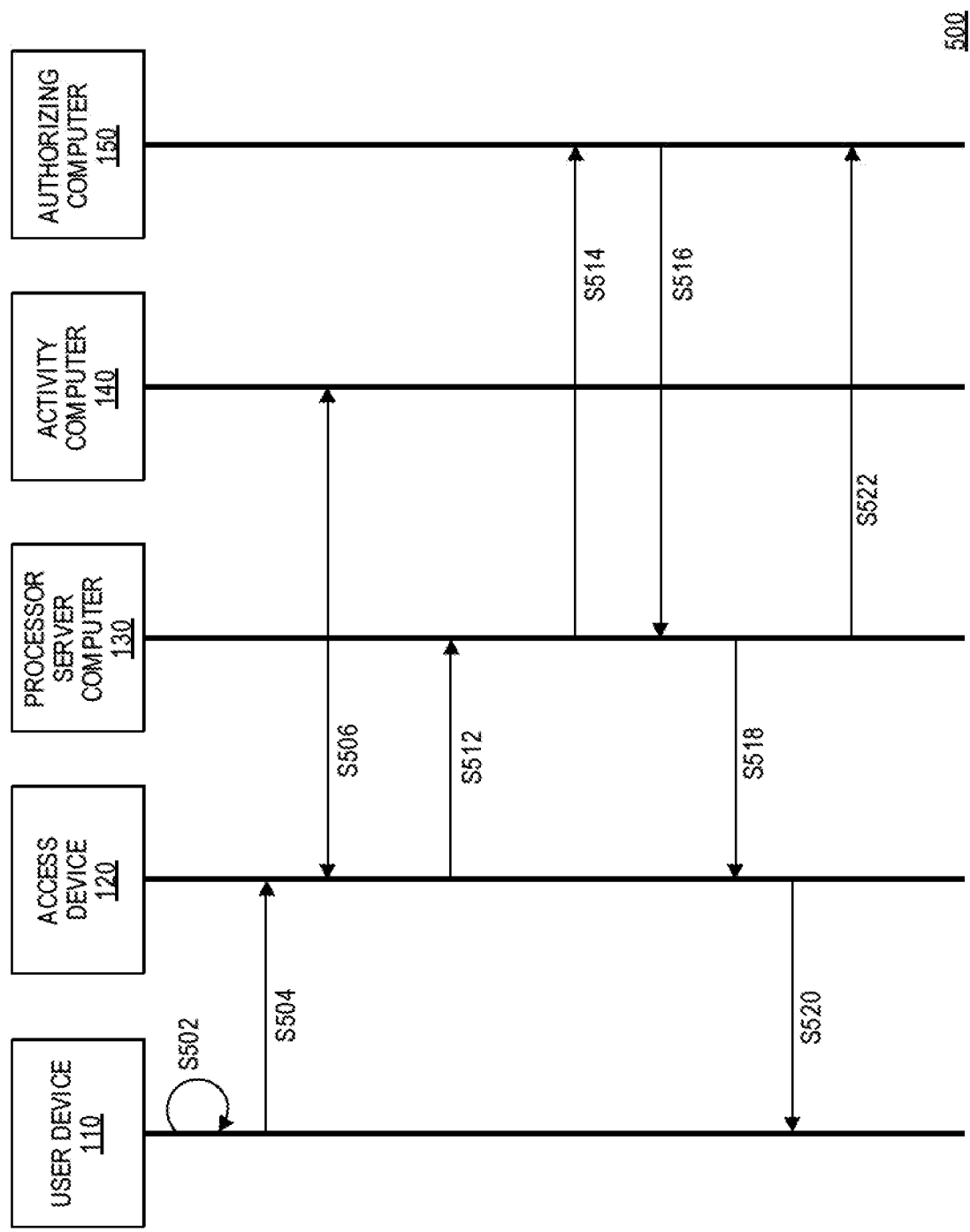

SYSTEM AND METHOD FOR ACTIVITY BASED INTERACTION

BACKGROUND

There are a number of conventional systems that provide incentives for users to make purchases. Such conventional systems typically inform users of offers (e.g., through e-mail, text, U.S. mail, etc.), and the users will then act on those offers. For example, a typical user that is a frequent customer might receive an e-mail coupon for a discount of 20 percent off of the user's next purchase at a resource provider such as a grocery store. When the user visits the grocery store to purchase food, the user can present the coupon, and 20 percent can be deducted off of the total purchase price for the food. The user may then use a credit card, debit card, or cash to pay for the discounted value.

While conventional systems for providing incentives are useful, conventional systems are configured to only provide incentives for the specific resource providers that operate the conventional systems. Further, the incentives are typically based on the past purchasing behavior of the user or are statically set by the resource provider. Besides purchasing behavior, conventional incentive systems do not have the ability to influence users to behave in any particular manner that might benefit them or others.

Embodiments of the invention address these and other problems individually and collectively.

BRIEF SUMMARY

Embodiments of the invention can include systems and methods which can incorporate the use of user activity to alter a value of a transaction. The user activity may be exercise. An activity metric such as calories expended within a period of time (e.g., 24 hours) may be used to determine an alteration value for the transaction. By doing so, the user can be encouraged to perform a certain type of activity for a certain period of time, that can be unrelated to the user's past transaction activity.

One embodiment of the invention is directed to a method. The method includes receiving an authorization request message for a transaction from an access device. The authorization request message includes a value and an account identifier. The user device is used by a user to conduct a transaction with the resource provider. The method, also includes determining an activity metric associated with the user of the user device, determining a value alteration based at least in part on the activity metric, and applying the value alteration to the value for the transaction.

Another embodiment of the invention is directed to a server computer such as a processor server computer configured to perform the above-noted method.

Another embodiment of the invention is directed to a method receiving, by an access device, a device identifier or an account identifier from a user device. The method also includes transmitting, by the access device, the device identifier or the account identifier to an activity computer in an activity request message, and receiving, by the access device, an activity response message comprising an activity metric. Then, the access device can alter a value of a transaction amount conducted between the user device and the access device, and can generate an authorization request message comprising the altered transaction amount. The method further includes transmitting the authorization request message comprising the altered transaction amount to an authorizing computer.

Another embodiment of the invention is directed to an access device configured to perform the above-noted method.

These and other embodiments of the invention are described in further detail below.

BRIEF DESCRIPTION OF THE DRAWINGS

FIG. 5 illustrates another flow diagram illustrating another process flow according to another embodiment of the invention. In this embodiment, a remote value alteration computer is not necessary.

DETAILED DESCRIPTION

Figure 1:
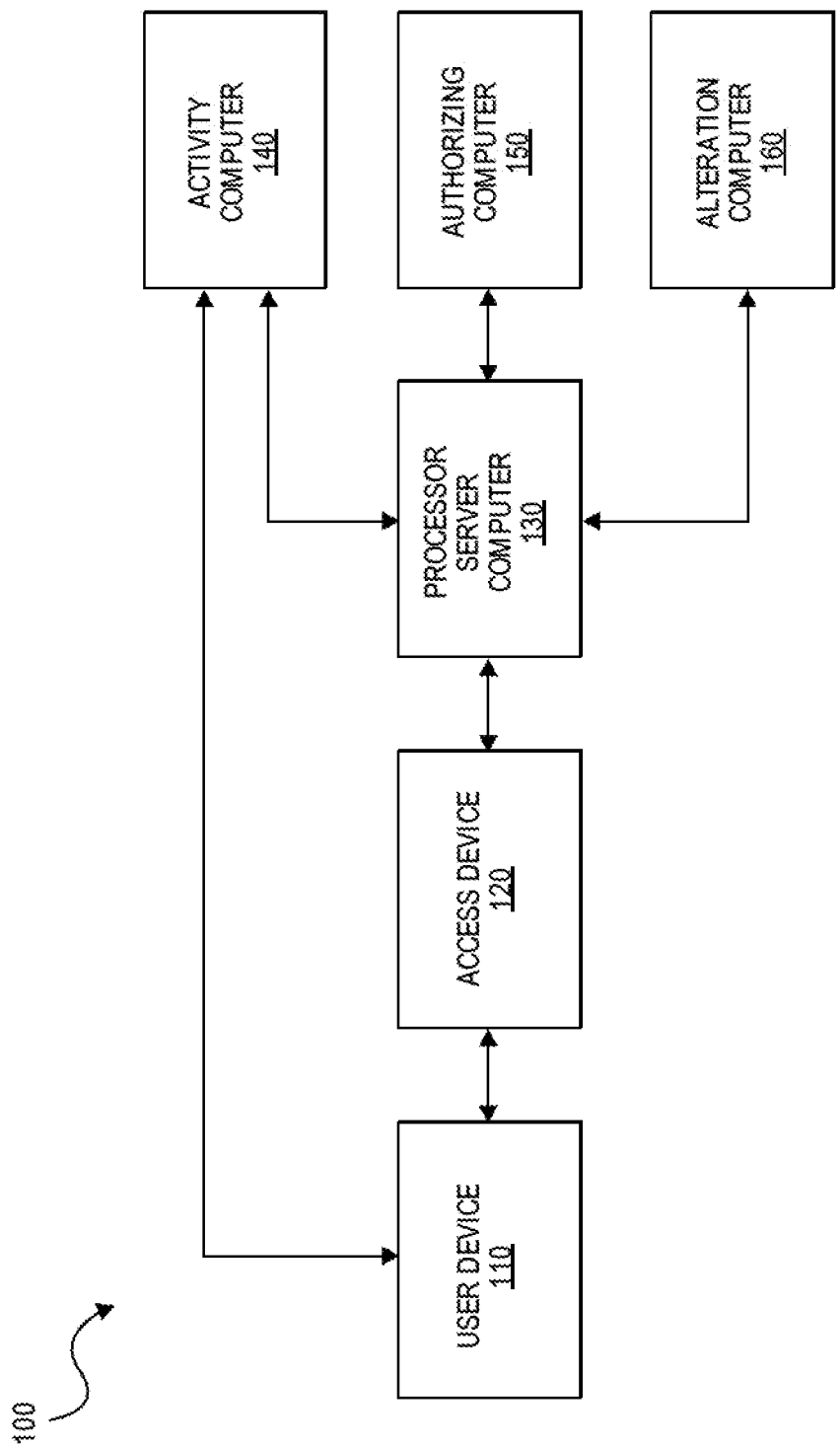
FIG. 1 shows a block diagram of a system according to an embodiment of the invention.

Embodiments of the invention can include systems and methods which can incorporate the use of user activity to alter a value of a transaction. The user activity may be exercise. An activity metric such as calories expended within a period of time (e.g., 24 hours) may be used to determine an alteration value for the transaction. In embodiments of the invention, the alteration value for the transaction may be used to adjust a value of the transaction. The magnitude of the alteration value may vary depending upon the amount of activity performed by the user. For example, a user may expend 1000 calories in a 24 hour period and may receive a discount of 20 percent off of his or her next purchase transaction at a merchant. The user may alternatively expend 500 calories in a 24 hour period and may receive a discount of 10 percent off of his or her next purchase at a particular merchant. As illustrated by this example, the user can be encouraged to perform a certain type of activity for a certain period of time, that can be unrelated to the user's past transaction activity with a particular resource provider. This advantageously encourages the user to perform specific activity in exchange for discounts related to current or future transactions. In the case of fitness, this promotes the user's health and well-being, and improves upon conventional systems that do not do so.

Prior to discussing embodiments of the invention, descriptions of some terms may be helpful in understanding embodiments of the invention.

A "user device" may comprise any suitable electronic device that may be used by a user to conduct an electronic transaction. A user device may be in the form of a payment device. In some embodiments, the user device may be a "mobile device" that can be transported and operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile devices include mobile phones (e.g. cellular phones), PDAs, tablet computers, net books, laptop computers, personal music players, hand-held specialized readers, etc. Further examples of mobile devices include wearable devices, such as smart watches, fitness bands, ankle bracelets, rings, earrings, etc., as well as automobiles with remote communication capabilities. A mobile device may comprise any suitable hardware and software for performing such functions, and may also include multiple devices or components (e.g. when a device has remote access to a network by tethering to another device—i.e. using the other device as a modem—both devices taken together may be considered a single mobile device).

A "wearable device" may be any suitable electronic device that can be worn by a user. Examples of wearable devices are provided above. Wearable devices may include electronic components including a processor, which may be in communication with one or more memory units (which may include non-transitory computer readable media), one or more sensors (e.g., accelerometers, temperature sensors, electrical sensors, etc.) for measuring activity or physical characteristics of a user, input/output devices, and communication interfaces (to provide short range communication such as NRC or Bluetooth or long range communication such as with a cellular tower).

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized). Example payment devices may include smart cards, magnetic stripe cards, keychain devices (such as the Speedpass™ commercially available from Exxon-Mobil Corp.), etc. Other examples of mobile devices include pagers, payment cards, security cards, access cards, smart media, transponders, and the like. If the payment device is in the form of a debit, credit, or smartcard, the payment device may also optionally have features such as magnetic stripes. Such devices can operate in either a contact or contactless mode. In some embodiments, a mobile device (e.g., a wearable device) can function as a payment device (e.g., a mobile device can store and transmit payment credentials for a transaction).

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc.

A "value credential" may be information associated with worth. Examples of value credentials include payment credentials, coupon identifiers, information needed to obtain a promotional offer, etc.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

A "resource provider" may be an entity that can provide a resource such as goods, services, information, and/or access. Examples of resource providers include merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An "issuer" may typically refer to a business entity (e.g., a bank) that maintains an account for a user. An issuer may also issue payment credentials stored on a user device, such as, a cellular telephone, smart card, tablet, or laptop to the consumer.

An "access device" may be any suitable device that provides access to a remote system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, remote computers (e.g., a merchant Web server), security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

An "activity metric" may be a quantitative value associated with a user's physical activity. Common activity metrics may include, but is not limited to, calories expended, sleep quality, heart rate, and activity level. An activity metric may also be a binary value (e.g., yes or no) where the value indicates whether or not a threshold is achieved.

FIG. 1 shows a block diagram of a system 100 according to embodiments of the invention. The system 100 may include user device 110, access device 120, server computer 130, activity computer 140, authorizing computer 150, and value alteration computer 160. The user device 110, access device 120, processor server computer 130, activity computer 140, authorizing computer 150, and value alteration computer 160 may all be in operative communication with each other through any suitable communication channel or communications network.

Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices in FIG. 1 (and described with respect to FIG. 1), as well as in the other Figures, may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

In some embodiments, the access device 120, the processor server computer 130, the authorizing computer 150, and the alteration computer 160 may communicate via one type of communication path using data in one type of data format (e.g., ISO 8583). The user device 110 and/or the processor server computer 130 may communicate with the activity computer 140 through another type of communication path using data in another type of data format (e.g., Internet or cellular communication protocols). Further, assuming that the access device 120 and the user device 110 are proximate to each other, in some embodiments, the user device 110 may communicate with the access device 110 using a short range data transmission technology such as RFID, Bluetooth™, IR, etc.

The user device 110 may include any device associated with a user and capable of providing transaction credentials to the access device 120. In some embodiments, the transaction credentials may be provided to the access device 120 by the user device 110 using an access data application (e.g., a digital wallet application). The user device 110 may include, but is not limited to, a payment card, mobile device (e.g., smartphone or tablet), or a wearable device (e.g., a fitness band or smartwatch). In some embodiments, the user device 110 may communicate any activity data or activity metrics to a remotely located activity computer 140. It may also communicate activity data or any activity metrics to the access device 120 during a transaction.

In some embodiments, the user device 110 may be a wearable device such as a smart watch or fitness band, which may also be used as a payment device. In other embodiments, the user device 110 may be a mobile phone or a payment card, and the user may utilize a separate wearable device to track and record the activity of the user.

The access device 120 may be associated with a resource provider (e.g., merchant) and may reside within a physical resource provider location or within a resource provider's network for online transactions.

Figure 2:
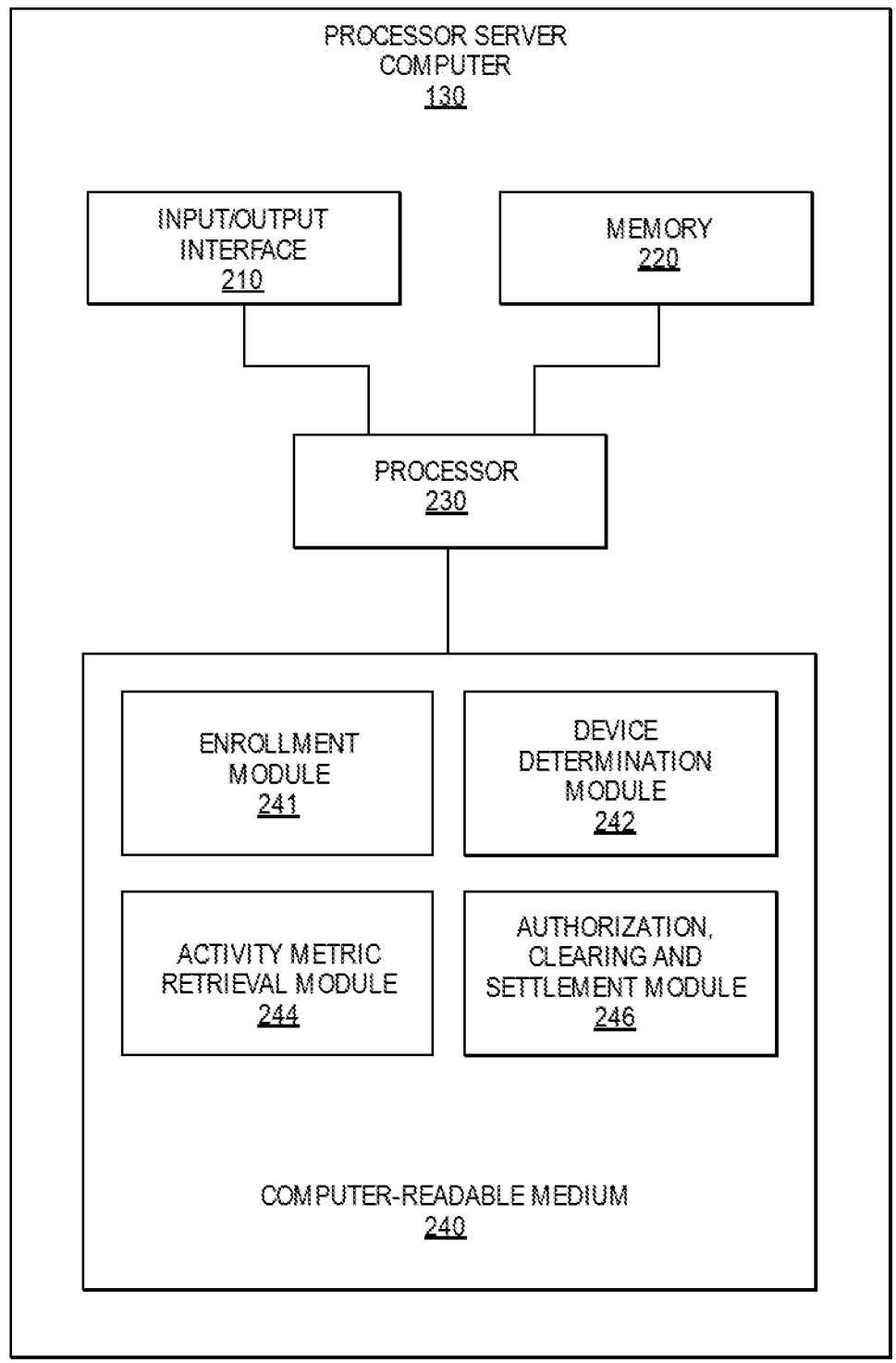
FIG. 2 shows a block diagram of a processor server computer.

The server computer 130 may be associated with a payment processing network and may be operable to process transactions within the system. In some embodiments, the user device 110 may be able to track one or more activity metrics associated with the user of the user device 110 via one or more hardware components within the user device 110. The user device 110 may alternatively or additionally generate activity data FIG. 2 shows a block diagram of a server computer 130, in accordance with some embodiments of the invention. The server computer 130 includes an input/output interface 210, a memory 220, a processor 230, and a non-transitory computer-readable medium 240. In some embodiments, server computer 120 may reside within a payment processing network cloud.

The input/output (I/O) interface 210 is configured to receive and transmit data from external devices or apparatuses. For example, the I/O interface 210 may receive an authorization request and may obtain activity related data associated with a user over a communication channel. The I/O interface 210 may also be used for direct interaction with the server computer 130. The server computer 130 may accept input from an input device such as, but not limited to, a keyboard, keypad, or mouse. Further, the I/O interface 210 may display output on a display device.

Memory 220 may be any magnetic, electronic, or optical memory. It can be appreciated that memory 220 may include any number of memory modules. An example of memory 220 may be dynamic random access memory (DRAM).

Processor 230 may be any general-purpose processor operable to carry out instructions on the server computer 130. The processor 230 is coupled to other units of the server computer 130 including input/output interface 210, memory 220, and computer-readable medium 240.

A "processor" may refer to any suitable data computation device or devices. A processor may comprise one or more microprocessors working together to accomplish a desired function. A processor may include CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

Computer-readable medium 340 may be any magnetic, electronic, optical, or other computer memory device. In some embodiments of the invention, computer-readable storage medium 340 includes enrollment module 241, device determination module 242, activity metric retrieval module 244, and authorization, clearing and settlement module 246.

The enrollment module 241 may be configured to, when executed by processor 230, enroll a user device identifier with the processor server computer 130. The user device identifier could be, for example, mobile phone number, an IP address, an IMEI number, a SIM card number, etc. In some embodiments, a credential such as a primary account number (e.g., a PAN) for an account such as a payment account (e.g., a credit or debit card account), or access data may be obtained from the user via the user device or another device operated by the user) and the credential may be linked to the device identifier. For example, if the user device identifier is a phone number, then that phone number may be linked to a PAN that is used by the user to conduct purchase transactions. The device identifier, the credentials, and other data of the user may be stored in the memory 220 or any other suitable database.

The device determination module 242 may be configured to, when executed by processor 230, determine a device identifier (ID) of the user device 110 during the course of the transaction. The determination of the device identifier may or may not involve a separate communication to a remotely located activity server computer. For example, the server computer 130 may receive an authorization request message from the access device 120 after the user initiates the transaction using his or her user device 110. Upon receiving the authorization request, the server computer 130 may determine a device ID associated with the user device 110 based on information contained within the authorization request message. For example, the authorization request message may include a primary account number (PAN) or token (i.e., a substitute or pseudo-PAN for a PAN). Based on the PAN or token, the device determination module 242 may determine the device ID registered to use that PAN or token. The device determination module 244 may then use elements within the device ID to determine whether the user device 110 is enrolled in an activity tracking program. For example, the device ID may indicate that the manufacturer of the user device 110 provides activity tracking functionalities. This determination may be made by querying a database within the server computer 130 (not shown) or by querying a database residing within the activity computer 140. In other embodiments, the device identifier of the user device 110 may be received in an authorization request message along with an account identifier. The device determination module 242, in conjunction with the processor 230, may then extract the device identifier from the user device 110 to determine the device identifier.

In some embodiments, the authorization request message may include an indicator that the user device 110 is enrolled in an activity tracking program. If it is determined that the user device 110 is enrolled in an activity tracking program, the device determination module 242 may interact with the activity metric retrieval module 244, as described below.

The activity metric retrieval module 244 may be configured to, when executed by processor 330, obtain or retrieve one or more activity metrics associated with the user of the user device 110. For example, once the device determination module 242 determines the device ID of the user device 110 and that the user device 110 is enrolled in an activity tracking program, the activity metric retrieval module 242 may work with the processor 230 to obtain or retrieve one or more activity metrics associated with the user of the user device 110 from the activity computer 140. This may be done by transmitting an activity metric request message to a remotely located activity computer, and receiving, in return, the requested activity metric. The activity metric request and response messages may be in a different data format than the previously described authorization request message. In some embodiments, the activity computer 140 may be associated with a manufacturer of the user device 110 or with an activity tracking entity. For example, the activity metric retrieval module 244, in conjunction with the processor 230, may obtain a number of calories expended by the user of the user device 110 within a predefined time period. For example, the activity retrieval module 244 may obtain or retrieve data from the activity computer 140 indicating that the user of the user device 110 expended 1,750 active calories in the last seven days. Upon retrieving the one or more activity metrics associated with the user of the user device 110, the activity metric retrieval module 244 may, in conjunction with the processor 230, interact with the value alteration computer 160 to determine whether the user associated with the user device 110 qualifies for a transaction alteration (e.g., a transaction discount) based on the obtained or more activity metrics.

The authorization, clearing and settlement module 246 may be configured to, when executed by processor 230, authorize, clear and settle a transaction that may incorporate a value alteration (e.g., a discount) based on the one or more activity metrics associated with the user obtained by the activity metric retrieval module 244. For example, if the value alteration computer 160 indicates that the transaction is eligible for a value alteration by virtue of the user fulfilling a certain activity metric criteria, the authorization, and clearing and settlement module 246 may incorporate the value alteration during the transaction flow. In some embodiments, the authorization, clearing and settlement module 246, in conjunction with the processor, may replace the original transaction amount in the authorization request message with an updated transaction amount that reflects the value alteration (e.g., the original transaction amount less a discount). The authorization, clearing and settlement module 246, in conjunction with the processor 230, may then clear and settle the updated transaction amount with the authorizing computer 150, and clear and settle the altered amount with the value alteration computer 160. In other embodiments, the authorization, clearing and settlement module 246, in conjunction with the processor, may clear and settle the full original transaction amount with the authorizing computer 150 and then facilitate a "cash back" credit to the account associated with the user of the user device 110 in the amount of the discount.

Figure 3:
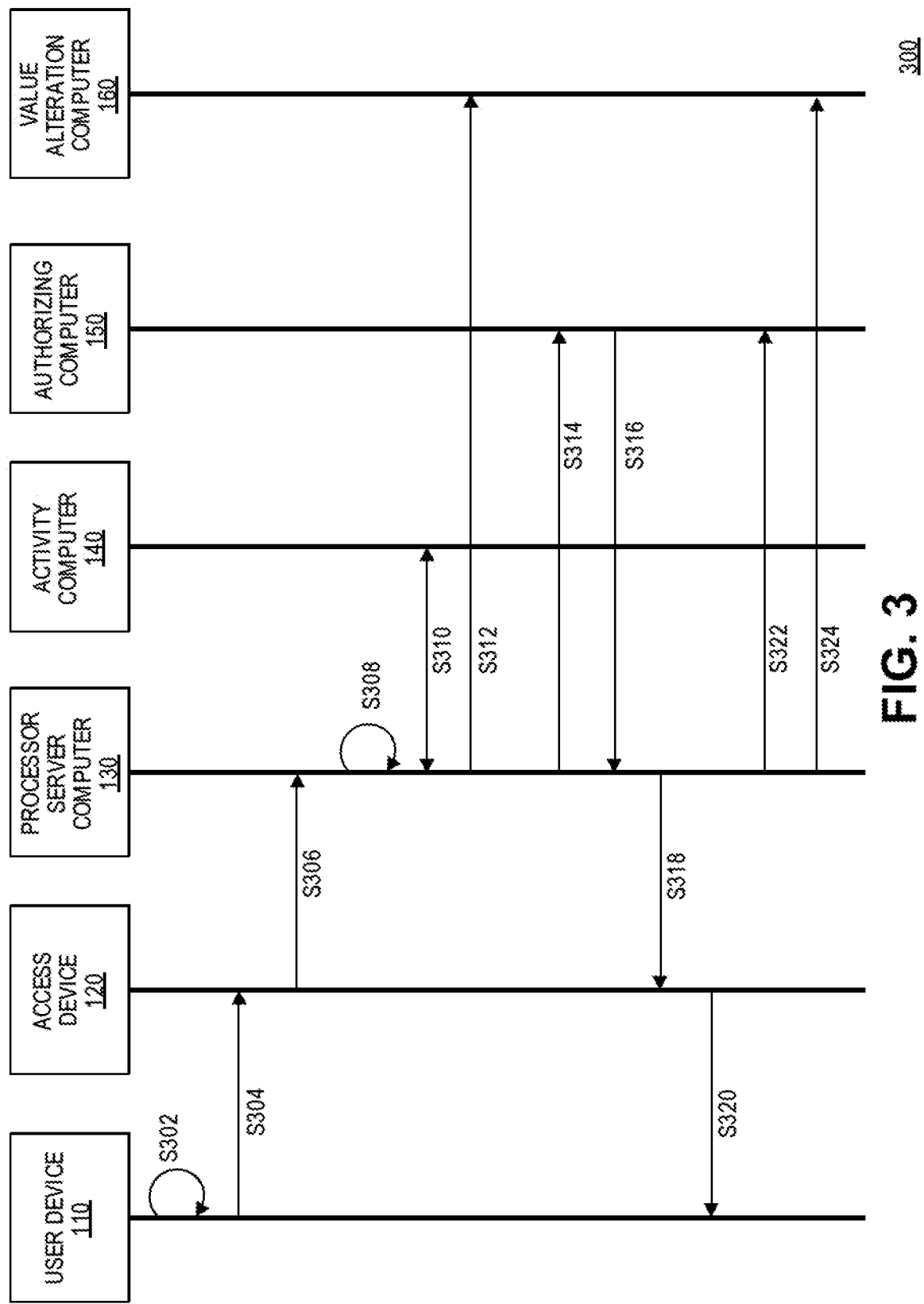
FIG. 3 illustrates a flow diagram illustrating a process flow according to an embodiment of the invention.
Figure 4:
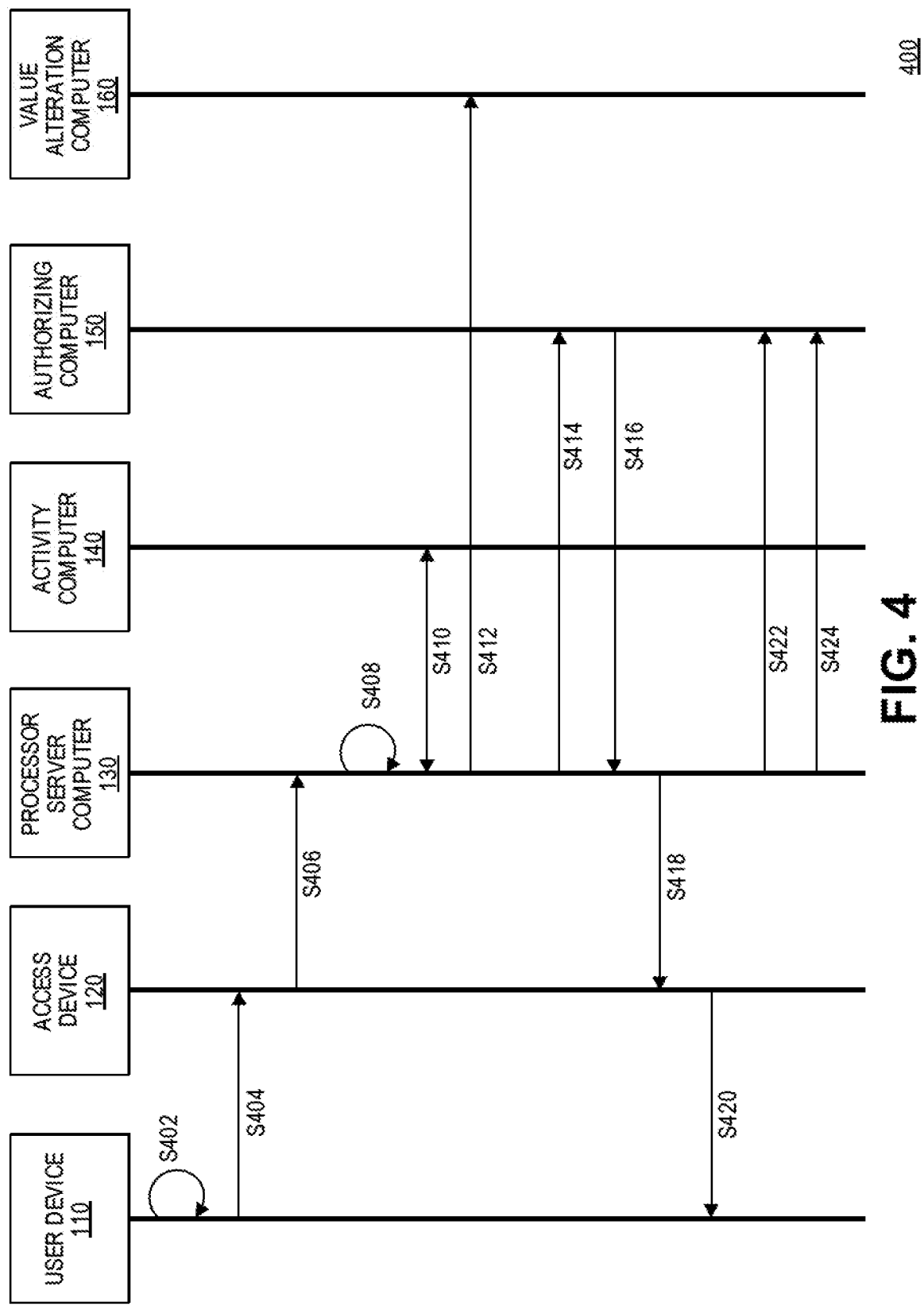
FIG. 4 illustrates another flow diagram illustrating another process flow according to an embodiment of the invention.

Prior to discussing the specific steps illustrated in FIGS. 3, 4, and 5, it is noted that a user may enroll his or her user device 110 with the processor server computer 120 as explained above. The user may provide the device identifier associated with the user device 110 and an account identifier to the processor server computer 120. The user may also provide the type of device and the manufacturer of the device to the processor server computer 120.

Also in FIGS. 3-5, a transport computer such as an acquirer computer is omitted for clarity of illustration. It is possible to include such a computer between the access devices and the processor server computers. Such transport computers may be associated with the resource providers operating the access devices, and may participate in settlement processes conducted between the processor server computer and the authorizing computer(s).

FIG. 3 illustrates a process flow 300 according to an embodiment of the invention. In the process flow illustrated in FIG. 3, settlement can occur between the processor server computer 120, the authorizing computer 150, and the value alteration computer 160.

At step S302, a user may initiate a payment transaction using his or her user device 110. For example, the user may interact with a digital wallet application or activity application executing on the user device 110 in order to initiate the transaction process. The digital wallet application or activity application may be associated with a user account associated with the user. The user may open the digital wallet application or activity application on the user device 110 and enter his or her authentication information (e.g., a password) into the application. Then, for example, the user may select an option to begin a transaction.

At step S304, after the user initiates the transaction with his or her user device 110, the user may interact with the access device 120 using his or her user device 110. In some embodiments, the access device 120 may be located within a merchant location. For example, the access device 120 may be a point-of-sale (POS) device located near the checkout area at the merchant location. For example, this step may occur when the user is ready to checkout and pay for merchandise obtained from the merchant location. For example, the user may interact with the access device 120 by "tapping" his or her user device 110 against the access device 120 to initiate a near-field connection (NFC). In some embodiments, the user device 110 may also connect to the access device 120 using Bluetooth, Wi-Fi, or any other wireless communication link. Upon creating the connection between the user device 110 and the access device 120, the user device 110, via the digital wallet application or other activity application, may transmit the user's account information to the access device 120.

At step S306, after user device 110 interacts with the access device 120 and transmits the user's account information to the access device 120, the access device 120 may generate and send an authorization request message to the server computer 130. The authorization request message 130 may include the user's account information (e.g., credentials including a PAN or primary account number), and other relevant information pertinent to the transaction. In some embodiments, a device identifier associated with the user device may also be sent from the user device 110 to the access device 120. In yet other embodiments, an activity metric may be transmitted from the user device 110 to the access device 120.

At step S308, after the access device 120 generates and sends the authorization request message to the server computer 130, the server computer 130 may determine whether the user device 110 is enrolled in an activity tracking program. For example, if the device identifier is sent in the authorization request message, the server computer 130 can determine a manufacturer of the user device 110 based at least in part on the received device identifier in the authorization request message. The server computer 130 may make the determination from a local database having this information and residing within the server computer 130, or may query another server computer to obtain the information. The server computer 130 may determine that the manufacturer of the user device 110 participates in the activity tracking program. In other embodiments, the device identifier is not present in the authorization request message and the processor server computer 130 may determine if the user device 110 is enrolled by looking up the device identifier using the received account identifier that is present in the authorization request message. Enrollment status using the device identifier can then be determined as noted above. In yet other embodiments, the authorization request message may include an indicator that the user device 110 is enrolled in an activity tracking program. The presence of the indicator can indicate that the user device 110 is enrolled in the activity tracking program.

At step S310, after the server computer 130 determines whether the user device 110 is enrolled in an activity tracking program, the server computer 130 may query the activity computer 140 to obtain one or more activity metrics associated with the user and the user device 110. For example, if the server computer 130 determines that the user device 110 is enrolled in an activity tracking program, the server computer 130 may query the activity computer which may be associated with the manufacturer of the user device 110 or with an activity tracking service associated with the user device 110 to obtain the one or more activity metrics.

At step S312, after the server computer obtains the one or more activity metrics associated with the user and the user device 110, the server computer 130 may query a value alteration computer 160 to determine whether the user of the user device 110 qualifies for a value alteration in the present transaction based on the obtained one or more activity metrics. In some embodiments, the value alteration computer 160 may be associated with an offer providing entity that may offer discounts for the transaction based on the activity metrics associated with the user. For example, if the user has expended a certain number of calories in a predefined time period, the value alteration computer 160 may offer a discount in the present transaction. For example, if the server computer 130 obtained information from the activity computer 140 indicating that the user expended 1750 active calories in the present week, the server computer 130 may query the value alteration computer 160 with this information. The value alteration computer 160 may be offering a $5 transaction discount to any user who has expended at least 1500 calories in the present week. Accordingly, the value alteration computer 160 may indicate to the server computer 130 that the user is eligible for a $5 discount in the present transaction since he or she has expended the requisite number of calories to qualify for the discount.

In some embodiments, the processor server computer 130 the activity metric may be an indication of whether or not a user has satisfied in activity threshold. In some cases, the processor server computer 130 never actually receives the specific activity data such as calories expended. Rather, the processor server computer 130 may simply query the activity computer 140 with activity metric criteria. The activity computer 140 may then return a binary "yes"/"no" result. For example, the processor server computer 130 after determining the device identifier for the user device 110, the processor server computer 130 may send an activity request message including the device identifier to the activity computer 140 which asks if the user using the user device 110 has expended more than 20,000 calories in the past week. This may be the threshold necessary for a transaction value alteration. The activity computer 140 may respond with a "yes" or "no" depending upon whether the threshold is met. If the threshold is met, then the value alteration is applied. If it not, then it is not. This particular embodiment is advantageous, because the processor server computer 130 does not need to hold any specific activity data of the user, thereby preserving the user's privacy.

The value alteration of the transaction and the corresponding activity thresholds may vary. In some cases, they may be proportional to each other. For example, the value alteration may increase linearly with an increase in an activity metric. In other embodiments, the value alteration may increase in a stepwise fashion as the activity metric increases to different threshold values (e.g., 5 dollars for 5000 calories burned in a week, 10 dollars for 7500 calories burned in a week, etc.).

At step S314, after the server computer queries the value alteration computer 160 and determines that the user of the user device 110 qualifies for a discount, the server computer 130 may forward the authorization request message received from the access device 120 in step S306 to the authorizing computer 150. In some embodiments, the transaction amount may be altered before the authorization request message is sent to the authorizing computer 150. For example, if the original authorization request message had a 10 dollar transaction amount and the alteration value was 3 dollars, then the modified authorization request may include a 7 dollar transaction amount.

At step S316, the authorizing computer 150 may approve or deny the transaction based on the received authorization request message. The approval or denial of the transaction may be based on a number of factors traditionally used to authorize or deny a transaction. If the transaction is approved, the authorizing computer 150 may transmit an authorization response message to the server computer 130. At step S318, the server computer 130 may forward the authorization response message to the access device 120. At step S320, the access device 120 may complete the transaction initiated by the user device 110 and transmit data to the user device 110 indicating that the transaction was successful. After this, a clearing and settlement process may take place.

At step S322, when the clearing and settlement process begins, the server computer 130 may generate and send a first clearing request message to the authorizing computer 150. The first clearing request message may include an adjusted transaction amount that may be the original transaction amount less the discount offered by the value alteration computer 160. For example, if the original transaction amount was $100 and the value alteration computer 160 offered a $5 discount based on the one or more activity metrics associated with the user of the user device 110 (step S312), the adjusted transaction amount may be for $95. Accordingly, the server computer 130 may request that the authorizing computer 150 settle $95 in the clearing request message, instead of the full $100 transaction amount. Upon receiving the clearing request message, the authorizing computer 150 may settle for the adjusted transaction amount, either immediately or at some later point in time.

At step S324, the server computer 130 may generate and send a second clearing request message to the value alteration computer 160. The second clearing request message may include the discount amount offered by the value alteration computer 160. For example, if the original transaction amount was $100 and the value alteration computer 160 offered a $5 discount based on the one or more activity metrics associated with the user of the user device 110, the server computer may request that the value alteration computer 160 settle $5 in the clearing request message. Upon receiving the clearing request message, the value alteration computer 160 may settle for the discount amount, either immediately or at some point later in time.

As illustrated, two different entities may be responsible for settling different transaction amounts that add up to the original transaction amount. In such a way, a real-time "discount" may be applied to the transaction, such that the user of the user device 110 may only be charged for the original transaction amount less the discount, rather than the full transaction amount where the discount is credited back to the user account at some point later in time.

While the above example illustrates a $5 discount based on a prerequisite number of calories expended by the user of the user device 110, other types of discounts may also be available. For example, a tiered discount can be offered for a number of calories expended by the user, where the user may receive a $5 discount for the first 2,000 calories expended, and another $2.50 discount for every additional 1000 calories expended. Many different types of discount schemes may be employed with respect to the embodiments described herein.

FIG. 4 illustrates another flow according to other embodiments of the invention. In the process flow illustrated in FIG. 4, settlement can occur between the processor server computer 120 and the authorizing computer 150.

In the process illustrated in FIG. 4, steps S302, S304, S306, S308, S310, S312, S314, S316, S318, and S320 may respectively correspond to steps S402, S404, S406, S408, S410, S412, S414, S416, S418, and S420, and the descriptions of those steps are incorporated herein and need not be repeated.

However, at step S422 in FIG. 4, when the clearing and settlement process begins, the server computer 130 may generate and send a clearing request message to the authorizing computer 150, without a corresponding clearing request to the value alteration computer 160. The clearing request message may include the original transaction amount prior to applying any discount offered by the value alteration computer 160. For example, if the original transaction amount was $100 and the value alteration computer 160 offered a $5 discount based on the one or more activity metrics associated with the user of the user device 110, the clearing request message may still include the original transaction amount for $100. Upon receiving the clearing request message, the authorizing computer 150 may settle for the original transaction amount, either immediately or at some later point in time.

At step S424, the server computer 130 may instruct the authorizing entity associated with the authorizing computer 150 to issue a credit to the user account associated with the user in the amount of the value alteration offered by the value alteration computer 160 at some point after the authorizing computer 150 has settled the original transaction amount (step S422). At some point later, the server computer 130 may separately settle the value alteration amount with the value alteration computer 160.

FIG. 5 shows an embodiment, where an access device 120 determines a value alteration, instead of a server computer. The method can include receiving, by an access device, a device identifier or an account identifier from a user device. The method also includes transmitting, by the access device, the device identifier or the account identifier to an activity computer in an activity request message, and receiving, by the access device, an activity response message comprising an activity metric. Then, the access device can alter a value of a transaction amount conducted between the user device and the access device, and can generate an authorization request message comprising the altered transaction amount. The method further includes transmitting the authorization request message comprising the altered transaction amount to an authorizing computer.

At step S502, a user may initiate a payment transaction using his or her user device 110. For example, the user may interact with a digital wallet application or activity application executing on the user device 110 in order to initiate the transaction process. The digital wallet application or activity application may be associated with a user account associated with the user. The user may open the digital wallet application or activity application on the user device 110 and enter his or her authentication information (e.g., a password) into the application. Then, for example, the user may select an option to begin a transaction.

At step S504, after the user initiates the transaction with his or her user device 110, the user may interact with the access device 120 using his or her user device 110. In some embodiments, the access device 120 may be located within a merchant location. For example, the access device 120 may be a point-of-sale (POS) device located near the checkout area at the merchant location. For example, this step may occur when the user is ready to checkout and pay for merchandise obtained from the merchant location. For example, the user may interact with the access device 120 by "tapping" his or her user device 110 against the access device 120 to initiate a near-field connection (NFC). In some embodiments, the user device 110 may also connect to the access device 120 using Bluetooth, Wi-Fi, or any other wireless communication link. Upon creating the connection between the user device 110 and the access device 120, the user device 110, via the digital wallet application or other activity application, may transmit the user's account information to the access device 120. The user device 110 may also send the device identifier to the access device 120.

At step S506, after user device 110 interacts with the access device 120 and transmits the user's account information and device identifier to the access device 120, the access device 120 may optionally determine if the user device 110 participates in an activity program. The access device 120 may communicate with an external computer to determine this, or if may determine this by a database stored within it. If it does, then the access device transmits an activity request message to the activity computer 140 similar to the processes described above with respect to step S306. The activity request message may include the account identifier and/or the device identifier. The activity computer 140 can return the activity metric to the access device 120. After the access device 120 determines that the user is eligible for a value alteration, the access device 120 generates and formats an authorization request message with a transaction amount for the altered transaction amount (e.g., 7 dollars if the original transaction amount is 10 dollars and the alteration amount is 3 dollars).

At step S512, the access device 120 generates and sends the authorization request to the processor server computer 130. The processor server computer 130 then determines from the account identifier which authorizing computer should receive the authorization request.

At step S514, the processor server computer 130 transmits the authorization request message to the authorizing computer 150. The authorizing computer then decides if the transaction is authorized.

At step S516, the processor server computer 130 generates and sends a authorization response message to the processor server computer 130, and the processor server computer sends the authorization response message to the access device 120.

Steps S520 and S522 can be similar to steps S320 and S322 above and the descriptions are incorporated herein by reference; and they need not be repeated here.

In the embodiment in FIG. 5, the access device 120 does the processing to request the activity metric and apply the value alteration to the transaction, instead of the processor server computer.

Embodiments of the invention provide for a number of advantages. For example, embodiments of the invention can utilize transaction alterations as a way to encourage user activity. This can, among other things, improve the health and well-being of the user. In addition, the transactions can be altered using non-transaction information about the user, without compromising the confidentiality of the user's non-transaction information.

Other embodiments the invention may also be contemplated.

Another embodiment of the invention is directed to a method performed by a user device such as a wearable device. The method comprises storing an account identifier. After the account identifier is stored, the method comprises providing the account identifier to an access device in a transaction conducted between the user and a resource provider. The access device transmits an authorization request message comprising the account identifier and a transaction value to a server computer. The server computer determines an activity metric associated with the wearable activity device and applies a value alteration to the transaction value.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable, medium may reside on or within a single computational apparatus, and may be present on or within different computational apparatuses within a system or network.

The above description is illustrative and is not restrictive. The process flow may be extended beyond the number of components shown. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
   receiving, at a server computer, a first authorization request message for a transaction in a first data format, the first authorization request message comprising a transaction value and an account identifier from a point of sale device at a resource provider, wherein a user device comprising a sensor for detecting activity data is used by a user to conduct the transaction with the resource provider;
   determining, by the server computer, that the user is enrolled in at least one fitness tracking program;
   identifying, by the server computer, at least one third party computer maintaining the at least one fitness tracking program for the user;
   formatting, by the server computer, an activity request message in a second data format different than the first data format, and transmitting the activity request message to the identified at least one third party computer, thereby querying, by the server computer, the at least one third party computer for an activity metric criterion associated with the user in the form of a binary yes or no result based on a threshold and the activity data;
   receiving, by the server computer from the at least one third party computer in an activity response message, the activity metric criterion associated with the user;
   providing, by the server computer to an offer-provider computer, the activity metric criterion associated with the user;
   receiving, by the server computer from the offer-provider computer, a value alteration for the transaction based at least in part on the activity metric criterion; and
   applying, by the server computer, the value alteration to the value for the transaction by:
   generating a second authorization request message comprising a discount transaction value, wherein the discount transaction value corresponds to the transaction value minus the value alteration;
   transmitting the second authorization request message to an authorization entity associated with the account identifier;
   receiving an authorization response from the authorization entity;
   providing the authorization response to the point of sale device;
   generating and sending a first clearing request message having the discount transaction value to the authorization entity, thereby causing the authorization entity to settle for the discount transaction value; and
   generating and sending a second clearing request message having the value alteration to the offer-provider computer, thereby causing the offer-provider computer to settle for an amount of the value alteration.

2. The method of claim 1, wherein the first authorization request message further comprises a device identifier, and the device identifier is used to determine the activity metric criterion.

3. The method of claim 1, wherein the user device is a wearable activity device that stores the account identifier.

4. The method of claim 1, wherein the activity metric criterion is based at least in part on a number of calories expended by the user within a specified time period.

5. The method of claim 1, wherein the user device is a smart watch.

6. A system comprising a server computer for facilitating a transaction, comprising:
   a processor; and
   a non-transitory computer readable medium coupled the processor, the computer readable medium comprising code, executable by the processor, for implementing a method comprising:
   receiving a first authorization request message for a transaction in a first data format, the first authorization request message comprising a transaction value and an account identifier from a point of sale device at a resource provider, wherein a user device comprising a sensor for detecting activity data is used by a user to conduct the transaction with the resource provider;
   determining that the user is enrolled in at least one fitness tracking program;
   identifying at least one third party computer maintaining the at least one fitness tracking program for the user;
   formatting an activity request message in a second data format different than the first data format, and transmitting the activity request message to the identified at least one third party computer, thereby querying the at least one third party computer for an activity metric criterion associated with the user;
   receiving, from the at least one third party computer in an activity response message, the activity metric criterion associated with the user;
   providing, to an offer-provider computer, the activity metric criterion associated with the user in the form of a binary yes or no result based on a threshold and the activity data;
   receiving, from the offer-provider computer, a value alteration for the transaction based at least in part on the activity metric criterion associated with the user of the user device;
   applying the value alteration to the value for the transaction by:

generating a second authorization request message comprising a discount transaction value, wherein the discount transaction value corresponds to the transaction value minus the value alteration;

transmitting the second authorization request message to an authorization entity associated with the account identifier;

receiving an authorization response from the authorization entity;

providing the authorization response to the point of sale device;

generating and sending a first clearing request message having the discount transaction value to the authorization entity, thereby causing the authorization entity to settle for the discount transaction value; and generating and sending a second clearing request message having the value alteration to the offer-provider computer, thereby causing the offer-provider computer to settle for an amount of the value alteration.

7. The system of claim 6, wherein the user device is a smart watch.

8. The method of claim 1, wherein determining that the user is enrolled in at least one fitness tracking program includes:

identifying, by a device determination module of the server computer, a device identifier of the user device; and based on the device identifier of the user device, determining, by the device determination module of the server computer, that a manufacturer of the user device provides activity tracking information.

9. The method of claim 8, wherein determining that the manufacturer of the user device provides activity tracking information comprises querying a database with the device identifier.

10. The method of claim 1, wherein determining that the user is enrolled in at least one fitness tracking program includes:

identifying an indicator received in the first authorization request message indicating that the user is enrolled in the fitness tracking program.

11. The system of claim 6, wherein determining that the user is enrolled in at least one fitness tracking program includes:

identifying, by a device determination module of the server computer, a device identifier of the user device; and based on the device identifier of the user device, determining, by the device determination module of the server computer, that a manufacturer of the user device provides activity tracking information.

12. The system of claim 11, wherein determining that the manufacturer of the user device provides activity tracking information comprises querying a database with the device identifier.

13. The system of claim 6, wherein determining that the user is enrolled in at least one fitness tracking program includes:

identifying an indicator received in the first authorization request message indicating that the user is enrolled in the fitness tracking program.

* * * * *